(12) United States Patent
Hwang et al.

(10) Patent No.: US 10,670,877 B1
(45) Date of Patent: Jun. 2, 2020

(54) METHOD OF PRECISELY COMPARING AND POSITIONING SPECKLE PATTERNS

(71) Applicant: National Chung-Shan Institute of Science and Technology, Taoyuan (TW)

(72) Inventors: Yi-Yuh Hwang, Taipei (TW); Wei-Kuo Chang, Taoyuan (TW); Li-Chung Liu, Taoyuan (TW)

(73) Assignee: National Chung-Shan Institute of Science and Technology, Taoyuan (TW)

(*) Notice: Subject to any disclaimer, the term of this patent is extended or adjusted under 35 U.S.C. 154(b) by 0 days.

(21) Appl. No.: 16/224,663

(22) Filed: Dec. 18, 2018

(51) Int. Cl.
 *G02B 27/48* (2006.01)
 *G01B 11/00* (2006.01)
 *G06F 3/03* (2006.01)

(52) U.S. Cl.
 CPC ............ *G02B 27/48* (2013.01); *G01B 11/002* (2013.01); *G06F 3/0317* (2013.01)

(58) Field of Classification Search
 CPC ...... G02B 27/48; G01B 11/002; G06F 3/0317
 USPC ........................................................ 353/38
 See application file for complete search history.

(56) References Cited

FOREIGN PATENT DOCUMENTS

| EP | 2 641 694 | * | 9/2013 | ............ B23Q 15/20 |
| EP | 2 641 694 A1 | | 9/2013 | |
| EP | 2 641 694 B1 | | 5/2014 | |
| JP | H05-18713 A | | 1/1993 | |
| JP | 2011-134062 A | | 7/2011 | |
| JP | 2015-152490 A | | 8/2015 | |

* cited by examiner

*Primary Examiner* — Jerry L Brooks
(74) *Attorney, Agent, or Firm* — Winston Hsu

(57) ABSTRACT

The present invention is to provide a method of precisely comparing and positioning speckle patterns, which calculates light intensities of the speckle patterns, is capable of enhancing positioning accuracy of the speckle patterns, and is applicable to various navigation input devices for various types of notebook computers, multi-function keyboard and TV remote control.

9 Claims, 2 Drawing Sheets

METHOD OF PRECISELY COMPARING AND POSITIONING SPECKLE PATTERNS

BACKGROUND OF THE INVENTION

1. Field of the Invention

The present invention relates to a method of positioning speckle patterns, and more particularly, to a method of positioning speckle patterns of sub-pixels.

2. Description of the Prior Art

It is conventional to use movements of an optical mouse or a laser mouse to control the displacement of a displayed cursor, to achieve a screen navigation function. For example, the optical mouse uses an LED light source to illuminate an object surface at an angle of less than 20 degrees (the angle between the incident light and the object surface), and collaborates with a CMOS two-dimensional image sensor to observe the changes of the shadow at the object surface protrusion, so as to determine a relative displacement of the optical mouse to the object surface. The laser mouse irradiates the object surface with laser lights, takes a speckle pattern at a location where an incidence angle equals a reflection angle, and compares the two speckle patterns adjacent to each other to determine the relative displacement of the laser mouse to the object surface.

The laser mouse uses a two-dimensional image sensor to take two adjacent images for image comparison positioning, and the positioning accuracy is limited by the pixel size of the two-dimensional image sensor, such that the minimal scale for image comparison and positioning is usually the pixel size of the two-dimensional image sensor. In order to improve the accuracy of image comparison and positioning, the conventional technique is to adjust the manufacturing parameters of the two-dimensional image sensor to reduce the size of each pixel. However, for correct comparison and positioning, the areas of two object images for comparison and positioning have certain limit, and it is necessary to maintain a sufficient image feature (or difference) of the object images to obtain the correct positioning. Too small object image area would be easy to lead to deficiency of object image data and would not be correctly compared. Therefore, in order to reduce the pixel size of the two-dimensional image sensor, the conventional technique must further increase the size of the image sensor to match the size of the image array to maintain a sufficiently large comparison area. In this way, in order to improve the positioning accuracy, the parameters of the two-dimensional image sensor are adjusted to reduce the size of each pixel, and the image capturing range of the image array is increased. Since the amount of sensor pixels is increased, the production cost of the two-dimensional image sensor also increases.

Therefore, it is necessary to develop a method for improving the positioning accuracy, which can effectively improve the positioning accuracy of the laser mouse without increasing the manufacturing cost of the two-dimensional image sensor.

SUMMARY OF THE INVENTION

In order to solve the above problem of the prior art, the present invention provides a method of precisely comparing and positioning speckle patterns, which computes light intensities of speckle patterns to efficiently enhance positioning accuracy of the speckle patterns.

To achieve the above objective, the present invention provides a method of precisely comparing and positioning speckle patterns, which comprises: (A): setting an original coordinate, and using a sensor to measure an instantaneous speckle pattern of a target surface, to obtain an original speckle pattern, wherein the original speckle pattern comprises a first complex original coordinate value and a corresponding first complex light intensity value; (B): the sensor and the target surface performing a relative movement, and the sensor measuring the instantaneous speckle pattern of the target surface after the relative movement, to obtain a comparison speckle pattern, wherein the comparison speckle pattern comprises a second complex original coordinate value and a corresponding second complex light intensity value; and (C): setting a set of precise coordinates, and using a precise comparison algorithm to compute the original speckle pattern and the comparison speckle pattern, so as to obtain a relative displacement after the computation; wherein the relative displacement is located on the precise coordinate, and a coordinate accuracy of the precise coordinate is smaller than a coordinate accuracy of the original coordinate.

Preferably, according to the method of precisely comparing and positioning speckle patterns in the present invention, the sensor is a non-deformation speckle pattern imager.

Preferably, according to the method of precisely comparing and positioning speckle patterns in the present invention, the instantaneous speckle pattern is a non-deformation speckle pattern.

Preferably, according to the method of precisely comparing and positioning speckle patterns in the present invention, the original coordinate and the precise coordinate are polar coordinates.

Preferably, according to the method of precisely comparing and positioning speckle patterns in the present invention, the original coordinate and the precise coordinate are Cartesian coordinates.

Preferably, according to the method of precisely comparing and positioning speckle patterns in the present invention, the precise comparison algorithm computes the relative displacement according to the first complex original coordinate value and the first complex light intensity value of the original speckle pattern, and the second complex original coordinate value and the second complex light intensity value of the comparison speckle pattern.

Preferably, according to the method of precisely comparing and positioning speckle patterns in the present invention, the precise comparison algorithm comprises steps of: (A) generating a plurality of virtual reference images according to the original speckle pattern, wherein each of the virtual reference images comprises a virtual complex original coordinate value and a corresponding virtual complex light intensity value, and each of the virtual reference images further represents a virtual relative displacement, and the virtual relative displacement is located on the precise coordinate; and (B) using an algorithm of sum of absolute difference (SAD) to compute values between the comparison speckle pattern and each of the virtual reference images, to obtain a SAD value for each of the virtual reference images, and selecting a virtual reference image having a minimal SAD value within the virtual reference images, and taking a virtual relative displacement represented by the virtual reference image with the minimal SAD value as a relative displacement.

Preferably, according to the method of precisely comparing and positioning speckle patterns in the present invention, the precise comparison algorithm comprises steps of (A) generating a plurality of virtual reference images according to the original speckle pattern, wherein each of the virtual reference images comprises a virtual complex original coordinate value and a corresponding virtual complex light intensity value, and each of the virtual reference images further represents a virtual relative displacement, and the virtual relative displacement is located on the precise coordinate; and (B) using an algorithm of sum of square difference (SSD) to calculate values between the comparison speckle pattern and each of the virtual reference images, to obtain an SSD value corresponding to each of the virtual reference images, determining a virtual reference image having a minimal SSD value within the virtual reference images, and taking a virtual relative displacement represented by the virtual reference image as a relative displacement.

Preferably, according to the method of precisely comparing and positioning speckle patterns in the present invention, the precise comparison algorithm comprises steps of (A) generating a plurality of virtual reference images according to the original speckle pattern, wherein each of the virtual reference images comprises a virtual complex original coordinate value and a corresponding virtual complex light intensity value, and each of the virtual reference images further represents a virtual relative displacement, and the virtual relative displacement is located on the precise coordinate; and (B) using an algorithm of normalized cross correlation (NCC) to calculate values between the comparison speckle pattern and each of the virtual reference images, to obtain an NCC value corresponding to each of the virtual reference images, determining a virtual reference image having an NCC value closest to 1, and taking a virtual relative displacement represented by the virtual reference image as a relative displacement.

These and other objectives of the present invention will no doubt become obvious to those of ordinary skill in the art after reading the following detailed description of the preferred embodiment that is illustrated in the various figures and drawings.

DETAILED DESCRIPTION

The following illustrates specified embodiments to specify implementations of the present invention, and those skilled in the art may readily understand advantages and effects of the present invention accordingly.

Figure 1:
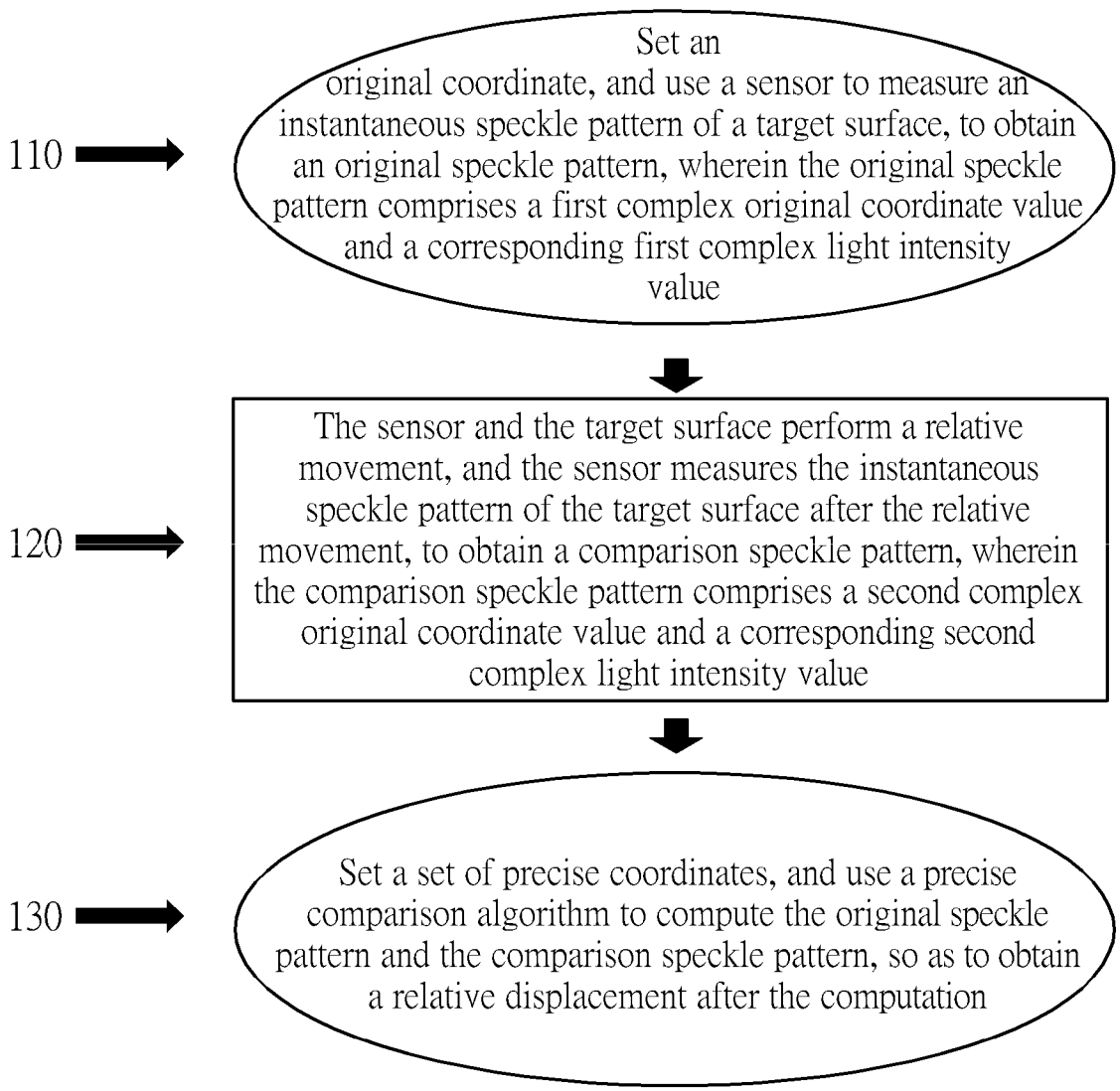
FIG. 1 is flowchart of a precise speckle pattern comparison and positioning method according to an embodiment of the present invention.

Please refer to FIG. 1. As shown in FIG. 1, the present invention provides a precise speckle pattern comparison and positioning method. The method comprises steps of:

Step (A) 110: set an original coordinate, and use a sensor to measure an instantaneous speckle pattern of a target surface, to obtain an original speckle pattern, wherein the original speckle pattern comprises a first complex original coordinate value and a corresponding first complex light intensity value;

Step (B) 120: the sensor and the target surface perform a relative movement, and the sensor measures the instantaneous speckle pattern of the target surface after the relative movement, to obtain a comparison speckle pattern, wherein the comparison speckle pattern comprises a second complex original coordinate value and a corresponding second complex light intensity value; and Step (C) 130: set a set of precise coordinates, and use a precise comparison algorithm to compute the original speckle pattern and the comparison speckle pattern, so as to obtain a relative displacement after the computation;

wherein the relative displacement is located on the precise coordinate, and a coordinate accuracy of the precise coordinate is smaller than a coordinate accuracy of the original coordinate.

The precise comparison algorithm may compute the relative displacement according to the first complex original coordinate value and the first complex light intensity value of the original speckle pattern, and the second complex original coordinate value and the second complex light intensity value of the comparison speckle pattern. In an embodiment of the precise comparison algorithm, the precise comparison algorithm comprises steps of:

(A) generating a plurality of virtual reference images according to the original speckle pattern, wherein each of the virtual reference images comprises a virtual complex original coordinate value and a corresponding virtual complex light intensity value, and each of the virtual reference images further represents a virtual relative displacement, and the virtual relative displacement is located on the precise coordinate; and (B) using an algorithm of sum of absolute difference (SAD) to compute values between the comparison speckle pattern and each of the virtual reference images, to obtain a SAD value for each of the virtual reference images, and selecting a virtual reference image having a minimal SAD value within the virtual reference images, and taking a virtual relative displacement represented by the virtual reference image with the minimal SAD value as a relative displacement. However, the present invention is not limited thereto. Preferably, the present invention may further utilize algorithms of SAD (sum of absolute difference), SSD (sum of square difference), NCC (normalized cross correlation), etc., to obtain the virtual reference image closest to the comparison speckle pattern by computations according to the first complex original coordinate value and the first complex light intensity value of the original speckle pattern, and the second complex original coordinate value and the second complex light intensity value of the comparison speckle pattern.

The present invention proposes a concept to improve the positioning accuracy of mouse-cursor navigation without increasing the manufacturing cost of the two-dimensional image sensor. The present invention discloses methods of two-dimensional sub-pixel positioning, sensor angle rotation, etc. which may effectively increase the positioning accuracy of mouse-cursor navigation without increasing the manufacturing cost of the two-dimensional image sensor, thereby achieving a two-dimensional image sensing module for a laser mouse with low cost and high coordinate accuracy.

The present invention may utilize a non-deformation speckle pattern imager. The non-deformation speckle pattern imager uses a homogenous light source to directly illuminate the object surface, and the three-dimensional texture of the object surface enters the two-dimensional imager of the speckle pattern imager to form the speckle pattern. Under a special design, the non-deformation speckle pattern imager can confirm the process that each constructive interference spot enters and moves out an image window of the two-dimensional imager image window, and the relative optical path difference of the interference spot is less than 1/5 wavelength, so most of the constructive interference spots entering and moving out the image window still maintain constructive interference, achieving the non-deformation image effect of the speckle pattern. Accordingly, the speckle patterns obtained by the non-deformation speckle pattern imager only move but do not deform, thereby named non-deformation speckle patterns, which may be used to obtain very precise relative displacements after image processing algorithms (e.g. SAD, SSD, NCC).

In the prior art, the image processing algorithms for the speckle pattern calculate the movements based on the positioning accuracy related to the pixels of the sensor. The present invention cuts the speckle pattern into sub-pixel combinations, assumes that the speckle pattern of each pixel are uniformly distributed, uses techniques of cutting sub-pixels to recombine the speckle pattern, predicts all possible speckle pattern combinations of sub-pixel movements, and compares and positions the instantaneous speckle pattern and the aforementioned all possible speckle pattern combinations of sub-pixel movements, to obtain positioning accuracy of two-dimension sub-pixel, which breaks through the limitations of positioning accuracy of one pixel of the prior art.

Figures 2, 3:
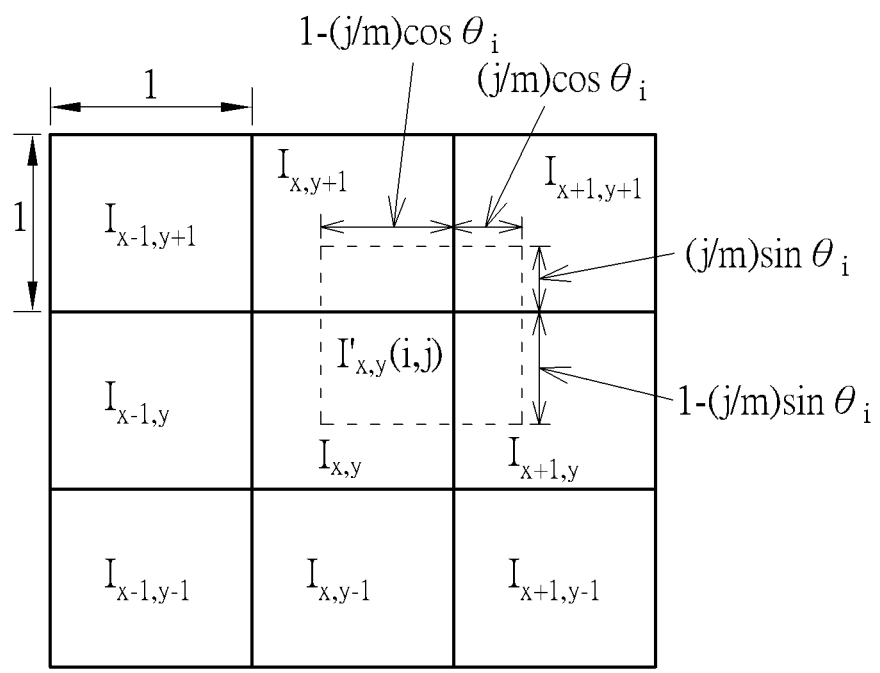
FIG. 2 is a schematic diagram of image intensity values at (x, y) and eight neighboring locations.
FIG. 3 is a schematic diagram of location relations of areas covered by the new image intensity $I'_{x,y}(i, j)$ and the original image intensity $I_{x,y}(i, j)$.

Please refer to FIG. 2 and FIG. 3, which are schematic diagrams of embodiments of the precise speckle pattern comparison and positioning method of the present invention. The embodiment illustrates how to establish a speckle pattern of n-direction and 1/m sub-pixel positioning. The sub-pixel coordinate is a precise coordinate. Related description is as follows: define unit angular displacement vectors: $(\cos \theta_i, \sin \theta_i)$, $\theta_i = (2\pi \times i)/n$, $i=0, 1, 2, \ldots, n-1$; cut the j/m sub-pixel displacement at each unit angular displacement vector, where m is a positive even number, $j=1, 2, \ldots, m/2$. Therefore, $n \times m/2$ virtual displacement vectors are generated, and each virtual displacement vector would generate a virtual reference speckle pattern, such that $(n \times m/2)$ virtual displacement speckle patterns are generated. Plus the original speckle pattern, there are $(n \times m/2)+1$ reference images for performing image comparison and position with the instantaneous speckle pattern, wherein the virtual displacement of the reference speckle pattern having the minimal SAD value is the displacement vector of n-direction, 1/m sub-pixel positioning accuracy of the instantaneous speckle pattern.

FIG. 2 is a schematic diagram of image intensity values at (x, y) and eight neighboring locations. In the image array, the image intensity value at coordinate (x, y) is $I_{x, y}$, and the image intensity values at the eight neighboring locations are: $I_{x+1, y}$, $I_{x+1, y+1}$, $I_{x, y+1}$, $I_{x-1, y+1}$, $I_{x-1, y}$, $I_{x-11, y-1}$, $I_{x, y-1}$, $I_{x+1, y-1}$. The intensity of the original speckle pattern is $I_{x, y}$. Considering a virtual image intensity $I'_{x, y}$ generated in the first quadrant $(0 \leq \theta_i < \pi/2)$, the image intensities that would contribute virtual displacement in the first quadrant are: $I_{x, y}$, $I_{x+1, y}$, $I_{x+1, y+1}$, $I_{x, y+1}$. In the $\theta_i$ direction, the unit virtual displacement vector of j/m sub-pixel displacement distance can be represented by: $[(j/m) \cos \theta_i, (j/m) \sin \theta_i]$. In the first quadrant, the original image intensity $I_{x, y}(i, j)$ moves j/m sub-pixels along the $\theta_i$ direction, and location relations of areas covered by the new image intensity $I'_{x, y}(i, j)$ and the original image intensity $I_{x, y}(i, j)$ are shown in FIG. 3. If the original image intensity $I_{x, y}(i, j)$ moves j/m sub-pixels along the $\theta_i$ direction, the area covered by the new image intensity $I'_{x, y}(i, j)$ would move, where the relationship between the new image intensity $I'_{x, y}(i, j)$ and the original image intensity $I_{x, y}(i, j)$ is: $I'_{x, y}(i, j) = I_{x, y}(i, j) \times$(area left after the virtual displacement)$+I_{x+1, y}(i, j) \times$(area generated after the virtual displacement)$+I_{x+1, y+1}(i, j) \times$(area generated after the virtual displacement)$+I_{x, y+1}(i, j) \times$(area generated after the virtual displacement)$=I_{x, y}(i, j) \times \{[1-(j/m)\cos \theta_i] \times [1-(j/m)\sin \theta_i]\} + I_{x+1, y}(i, j) \times (j/m) \cos \theta_i \times [1-(j/m)\sin \theta_i] + I_{x+1, y+1}(i, j) \times (j/m) \cos \theta_i \times (j/m) \sin \theta_i + I_{x, y+1}(i, j) \times [1-(j/m)\cos \theta_i] \times (j/m) \sin \theta_i$, where $0 \leq i < n/4$, $1 \leq j \leq m/2$.

By the same token, the image intensities that would contribute virtual displacement in the second quadrant are: $I_{x, y}$, $I_{x, y+1}$, $I_{x-1, y+1}$, $I_{x-1, y}$. Therefore, within $\pi/2 \leq \theta_i < \pi$, the image intensity $I'_{x, y}$ generated by the j/m sub-pixel moving all the possible virtual speckle pattern in the $\theta_i$ direction can be represented by: $I'_{x, y}(i, j) = I_{x, y}(i, j) \times$(area left after the virtual displacement)$+I_{x, y+1}(i, j) \times$(area generated after the virtual displacement)$+I_{x-1, y+1}(i, j) \times$(area generated after the virtual displacement)$+I_{x-i, y}(i, j) \times$(area generated after the virtual displacement)$=I_{x, y}(i, j) \times \{[1+(j/m)\cos \theta_i] \times [1-(j/m)\sin \theta_i]\} + I_{x, y+1}(i, j) \times [1+(j/m)\cos \theta_i] \times (j/m) \sin \theta_i + I_{x-1, y+1}(i, j) \times (j/m) (-\cos \theta_i) \times (j/m) \sin \theta_i + I_{x-i, y}(i, j) \times (j/m) (-\cos \theta_i) \times [1-(j/m)\sin \theta_i]$, where $n/4 \leq i < n/2$, $1 \leq j \leq m/2$.

By the same token, the image intensities that would contribute virtual displacement in the third quadrant are: $I_{x, y}$, $I_{x-i, y}$, $I_{x-1, y-1}$, $I_{x, y-1}$. Therefore, within $\pi \leq \theta_i < 3\pi/2$, the image intensity $I'_{x, y}$ generated by the j/m sub-pixel moving all the possible virtual speckle pattern in the $\theta_i$ direction can be represented by: $I'_{x, y}(i, j) = I_{x, y}(i, j) \times$(area left after the virtual displacement)$+I_{x-1, y}(i, j) \times$(area generated after the virtual displacement)$+I_{x-1, y-1}(i, j) \times$(area generated after the virtual displacement)$+I_{x, y-1}(i, j) \times$(area generated after the virtual displacement)$=I_{x, y}(i, j) \times \{[1+(j/\cos \theta_i)] \times [1+(j/m)\sin \theta_i]\} + I_{x-1, y}(i, j) \times (j/m) (-\cos \theta_i) \times [1+(j/m)\sin \theta_i] + I_{x-1, y-1}(i, j) \times (j/m)(-\cos \theta_i) \times (j/m) (-\sin \theta_i) + I_{x, y-1}(i, j) \times [1+(j/m)\cos \theta_i] \times (j/m)(-\sin \theta_i)$, where $n/2 \leq i < 3n/4$, $1 \leq j \leq m/2$.

By the same token, the image intensities that would contribute virtual displacement in the fourth quadrant are: $I_{x, y}$, $I_{x, y-1}$, $I_{x+1, y-1}$, $I_{x+1, y}$. Therefore, within $3\pi/2 \leq \theta_i < 2\pi$, the image intensity $I'_{x, y}$ generated by the j/m sub-pixel moving all the possible virtual speckle pattern in the $\theta_i$ direction can be represented by: $I'_{x, y}(i, j) = I_{x, y}(i, j) \times$(area left after the virtual displacement)$+I_{x, y-1}(i, j) \times$(area generated after the virtual displacement)$+I_{x+1, y-1}(i, j) \times$(area generated after the virtual displacement)$+I_{x+1, y}(i, j) \times$(area generated after the virtual displacement)$=I_{x, y}(i, j) \times \{[1-(j/m)\cos \theta_1] \times [1+(j/m)\sin \theta_i]\} + I_{x, y-1}(i, j) \times [1-(j/m) \cos \theta_i] \times (j/m)(-\sin \theta_i) + I_{x+1, y-1}(i, j) \times (j/m)\cos \theta_i \times (j/m)(-\sin \theta_i) + I_{x+1, y}(i, j) \times (j/m)\cos \theta_i \times [1+(j/m)\sin \theta_i]$, where $3n/4 \leq i < n$, $1 \leq j \leq m/2$.

The present invention provides an embodiment: using a 5×5 array image to predict all possible sub-pixel array speckle patterns of 8 directions and 1/4 pixel positioning accuracy. The prediction method is as follows: since the predicted array image is generated by the array image performing sub-pixel displacement, n×n array image can only produce (n−2)×(n−2) predicted array images; that is, 5×5 array image can only produce 3×3 predicted array image. The 5×5 array image is represented by the following table:

| 10 | 16 | 18 | 22 | 20 |
|----|----|----|----|----|
| 8  | 10 | 10 | 18 | 16 |
| 4  | 6  | 8  | 12 | 18 |
| 6  | 8  | 14 | 10 | 12 |
| 2  | 6  | 12 | 8  | 14 |

To predict the speckle patterns of 8 directions and ¼ pixel positioning accuracy, the above equation can be rewritten as: n=8, m=4, such that within $0 \leq \theta_i < \pi/2$, $0 \leq i < n/4$, $1 \leq j \leq m/2$, to obtain i=0, 1, j=1, 2. Meanwhile, the displacement vector is [(j/4)cos(iπ/4), (j/4)sin(iπ/4)], which generates four vectors of (¼, 0), (½, 0), (0.17678, 0.17678), (0.35355, 0.35355).

5×5 array image takes a center 3×3 array image as a reference image without sub-pixel displacement, and the 3×3 array image is represented by the following table:

| 10 | 10 | 18 |
|----|----|----|
| 6  | 8  | 12 |
| 8  | 14 | 10 |

To generate a 3×3 array virtual reference image with ¼ sub-pixel displacement in 0° direction, i.e. [¼×(cos 0°, sin 0°)=(0.25, 0)], according to the above equation, each virtual pixel can be represented as: $I'_{ij} = \frac{3}{4}I_{ij} + \frac{1}{4}I_{i+1, j}$, and a 3×3 sub-pixel displacement virtual array reference image is represented by the following table:

| 10  | 12 | 17.5 |
|-----|----|------|
| 6.5 | 9  | 13.5 |
| 9.5 | 13 | 10.5 |

By the same token, to generate a 3×3 array virtual reference image with ½ sub-pixel displacement in 0° direction, i.e. [½×(cos 0°, sin 0°)=(0.5, 0)], according to the above equation, each virtual pixel can be represented as: $I'_{ij} = \frac{1}{2} I_{ij} + \frac{1}{2} I_{i+1, j}$, and a 3×3 sub-pixel displacement virtual array reference image is represented by the following table:

| 10 | 14 | 17 |
|----|----|----|
| 7  | 10 | 15 |
| 11 | 12 | 11 |

By the same token, to generate a 3×3 array virtual reference image with ¼ sub-pixel displacement in 45° direction, i.e. [¼×(cos 45°, sin 45°)=(0.17678, 0.17678)], according to the above equation, each virtual pixel can be represented as: $I'_{i, j} = (1-0.17678) \times (1-0.17678) I_{ij} + 0.17678 \times (1-0.17678) I_{i+i, j} + 0.17678 \times 0.17678 I_{i+1, j+1} + (1-0.17678) \times 0.17678 I_{i+1, j} = 0.67769 I_{ij} + 0.14553 I_{i+1, j} + 0.03125 I_{i+1, j+1} + 0.14553 I_{i+1, j}$, and a 3×3 sub-pixel displacement virtual array reference image is represented by the following table:

| 11.123 | 12.703 | 18.354 |
|--------|--------|--------|
| 6.998  | 9.186  | 13.871 |
| 8.582  | 12.482 | 10.832 |

By the same token, to generate a 3×3 array virtual reference image with ½ sub-pixel displacement in 45° direction, i.e. [½×(cos 45°, sin 45°)=(0.35355, 0.35355)], according to the above equation, each virtual pixel can be represented as: $I'_{i, j} = (1-0.35355) \times (1-0.35355) I_{ij} + 0.35355 \times (1-0.35355) I_{i+1, j} + 0.35355 \times 0.35355 I_{i+1, j+1} + (1-0.35355) \times 0.35355 I_{i+1, j} = 0.41790 I_{ij} + 0.22855 I_{i, +1, j} + 0.12450 I_{i-+, j+1} + 0.22855 I_{i+1, j}$, and a 3×3 sub-pixel displacement virtual array reference image is represented by the following table:

| 12.362 | 15.146 | 18.697 |
|--------|--------|--------|
| 7.866  | 10.612 | 15.235 |
| 8.91   | 11.459 | 11.905 |

The second quadrant: n=8, m=4, and within $\pi/2 \leq \theta_i < \pi$, $n/4 \leq i < n/2$ and $1 \leq j \leq m/2$ to obtain i=2, 3 and j=1, 2. Meanwhile, the displacement vector is [(j/4)cos(iπ/4), (j/4)sin(iπ/4)], and generates 4 displacement vectors, which are:

1. a 3×3 array virtual reference image with ¼ sub-pixel displacement in 90° direction, i.e. [¼×(cos 90°, sin 90°)=(0, 0.25)], and is represented by the following table:

| 11.5 | 12   | 19   |
|------|------|------|
| 7    | 8.5  | 13.5 |
| 7.5  | 12.5 | 10.5 |

2. a 3×3 array virtual reference image with ½ sub-pixel displacement in 90° direction, i.e. [½×(cos 90°, sin 90°)=(0, 0.5)], and is represented by the following table:

| 13 | 14 | 20 |
|----|----|----|
| 8  | 9  | 15 |
| 7  | 11 | 11 |

3. a 3×3 array virtual reference image with ¼ sub-pixel displacement in 135° direction, i.e. [¼×(cos 135°, sin 135°)=(−0.17678, 0.17678)], and is represented by the following table:

| 10.582 | 11.352 | 17.418 |
|--------|--------|--------|
| 6.354  | 8.063  | 12.229 |
| 7.293  | 12.004 | 10.811 |

4. a 3×3 array virtual reference image with ½ sub-pixel displacement in 135° direction, i.e. [½×(cos 135°, sin 135°)=(−0.35355, 0.35355)], and is represented by the following table:

| 10.909 | 12.57  | 17.077 |
|--------|--------|--------|
| 6.703  | 8.245  | 12.202 |
| 6.584  | 10.254 | 11.117 |

The third quadrant: n=8, m=4, and within $\pi \leq \theta_i < 2\pi/3$, $n/4 \leq i < n/2$ and $1 \leq j \leq m/2$, to obtain i=4, 5 and j=1, 2. Meanwhile, the displacement vector is [(j/4)cos(iπ/4), (j/4)sin(iπ/4)], and generates 4 displacement vectors, which are:

1. a 3×3 array virtual reference image with ¼ sub-pixel displacement in 180° direction, i.e. [¼×(cos 180°, sin 180°)=(−0.25, 0)], and is represented by the following table:

| 9.5 | 10   | 16 |
|-----|------|----|
| 5.5 | 7.5  | 11 |
| 7.5 | 12.5 | 11 |

2. a 3×3 array virtual reference image with ½ sub-pixel displacement in 180° direction, i.e. [½×(cos 180°, sin 180°)=(−0.5, 0)], and is represented by the following table:

| 9 | 10 | 14 |
|---|----|----|
| 5 | 7  | 10 |
| 7 | 11 | 12 |

3. a 3×3 array virtual reference image with ¼ sub-pixel displacement in 225° direction, i.e. [¼×(cos 225°, sin 255°)=(−0.17678, −0.17678)], and is represented by the following table:

| 8.939 | 9.584  | 15.65  |
|-------|--------|--------|
| 6     | 8.582  | 11.189 |
| 6.295 | 10.652 | 8.814  |

4. a 3×3 array virtual reference image with ½ sub-pixel displacement in 225° direction, i.e. [½×(cos 225°, sin 225°)=(−0.35355, −0.35355)], and is represented by the following table:

| 7.877 | 9.04  | 13.546 |
|-------|-------|--------|
| 5.997 | 8.91  | 10.872 |
| 4.715 | 7.679 | 7.379  |

The fourth quadrant: n=8, m=4, and within $2\pi/3 \leq \theta_i < 2\pi$, $n/4 \leq i < n/2$ and $1 \leq j \leq m/2$, to obtain i=6, 7 and j=1, 2. Meanwhile, the displacement vector is [(j/4)cos(iπ/4), (j/4)sin(iπ/4)], and generates 4 displacement vectors, which are:

1. a 3×3 array virtual reference image with ¼ sub-pixel displacement in 270° direction, i.e. [¼×(cos 270°, sin 270°)=(0, −0.25)], and is represented by the following table:

| 9   | 9.5  | 16.5 |
|-----|------|------|
| 6.5 | 9.5  | 11.5 |
| 7.5 | 13.5 | 9.5  |

2. a 3×3 array virtual reference image with ½ sub-pixel displacement in 270° direction, i.e. [½×(cos 270°, sin 270°)=(0, −0.5)], and is represented by the following table:

| 8 | 9  | 15 |
|---|----|----|
| 7 | 11 | 11 |
| 7 | 13 | 9  |

3. a 3×3 array virtual reference image with ¼ sub-pixel displacement in 315° direction, i.e. [¼×(cos 315°, sin 315°)=(0.17678, −0.17678)], and is represented by the following table:

| 10.582 | 11.352 | 17.418 |
|--------|--------|--------|
| 6.354  | 8.063  | 12.229 |
| 7.293  | 12.004 | 10.811 |

4. a 3×3 array virtual reference image with ½ sub-pixel displacement in 315° direction, i.e. [½×(cos 315°, sin 315°)=(0.35355, −0.35355)], and is represented by the following table:

| 10.909 | 12.57  | 17.077 |
|--------|--------|--------|
| 6.703  | 8.245  | 12.202 |
| 6.584  | 10.254 | 11.117 |

The embodiment generates 17 pieces of 3×3 array reference image from the original 5×5 array image, which includes the $1^{st}$ original reference speckle pattern not undergoing virtual displacement, and the $2^{nd}$ to $17^{th}$ virtual displacement reference speckle pattern of eight directions and ¼ sub-pixel accuracy. After obtaining the instantaneous speckle pattern, the instantaneous speckle pattern and the 17 reference speckle patterns undergo SAD comparison and positioning, to generate 17 SAD comparison values, wherein the minimal SAD comparison value is the address of sub-pixel positioning of the instantaneous speckle pattern. For example, if the $1^{st}$ 3×3 array image is the reference image with the minimal SAD comparison value, it represents that the instantaneous speckle pattern does not have sub-pixel displacement. If the $2^{nd}$ 3×3 array image is the reference image with the minimal SAD comparison value, it represents that the instantaneous speckle pattern has sub-pixel displacement of (¼, 0). The rest of the situation can be analogized by the same method.

The present invention provides a method for precisely positioning speckle patterns with 1/m sub-pixel virtual displacement in n directions, which may increase computations. However, if FPGA parallel processing method is applied, the instantaneous speckle pattern may be simultaneously compared with [(n×m/2)+1] pieces of reference speckle patterns, which requires time equal to processing one piece of reference speckle pattern. In addition, as verified by laser interferometer experiment, the virtual sub-pixel displacement comparison method of the present invention may enhance the positioning accuracy to 1/20 to 1/10 sub-pixel positioning accuracy. Therefore, the precise speckle pattern comparison and positioning method of the present invention may enhance positioning accuracy of sub-pixel comparison for speckle patterns without decreasing comparing time, which can be applied in laser mouse, or further developed as speckle pattern slide controllers using finger slides to replace wrist movement, so as to easily and precisely control mouse-cursor movement, to be further applied to various navigation input devices for various types of notebook computers, multi-function keyboard (keyboard with speckle pattern slide controllers) and TV remote control.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of precisely comparing and positioning speckle patterns, comprising:

(A): setting an original coordinate, and using a sensor to measure an instantaneous speckle pattern of a target surface, to obtain an original speckle pattern, wherein the original speckle pattern comprises a first complex original coordinate value and a corresponding first complex light intensity value;

(B): the sensor and the target surface performing a relative movement, and the sensor measuring the instantaneous speckle pattern of the target surface after the relative movement, to obtain a comparison speckle pattern, wherein the comparison speckle pattern comprises a second complex original coordinate value and a corresponding second complex light intensity value; and (C): setting a set of precise coordinates, and using a precise comparison algorithm to compute the original speckle pattern and the comparison speckle pattern, so as to obtain a relative displacement after the computation;

wherein the precise coordinate is composed by subdividing sub-pixel displacement into a plurality of unit angular displacement vectors;

wherein the relative displacement is located on the precise coordinate, and a coordinate accuracy of the precise coordinate is smaller than a coordinate accuracy of the original coordinate.

2. The method of precisely comparing and positioning speckle patterns in claim 1, wherein the sensor is a non-deformation speckle pattern imager.

3. The method of precisely comparing and positioning speckle patterns in claim 2, wherein the instantaneous speckle pattern is a non-deformation speckle pattern.

4. The method of precisely comparing and positioning speckle patterns in claim 1, wherein the original coordinate and the precise coordinate are polar coordinates.

5. The method of precisely comparing and positioning speckle patterns in claim 1, wherein the original coordinate and the precise coordinate are Cartesian coordinates.

6. The method of precisely comparing and positioning speckle patterns in claim 1, wherein the precise comparison algorithm computes the relative displacement according to the first complex original coordinate value and the first complex light intensity value of the original speckle pattern, and the second complex original coordinate value and the second complex light intensity value of the comparison speckle pattern.

7. The method of precisely comparing and positioning speckle patterns in claim 6, wherein the precise comparison algorithm comprises steps of:

(A) generating a plurality of virtual reference images according to the original speckle pattern, wherein each of the virtual reference images comprises a virtual complex original coordinate value and a corresponding virtual complex light intensity value, and each of the virtual reference images further represents a virtual relative displacement, and the virtual relative displacement is located on the precise coordinate; and (B) using an algorithm of sum of absolute difference (SAD) to compute values between the comparison speckle pattern and each of the virtual reference images, to obtain a SAD value for each of the virtual reference images, and selecting a virtual reference image having a minimal SAD value within the virtual reference images, and taking a virtual relative displacement represented by the virtual reference image with the minimal SAD value as a relative displacement.

8. The method of precisely comparing and positioning speckle patterns in claim 6, wherein the precise comparison algorithm comprises steps of:

(A) generating a plurality of virtual reference images according to the original speckle pattern, wherein each of the virtual reference images comprises a virtual complex original coordinate value and a corresponding virtual complex light intensity value, and each of the virtual reference images further represents a virtual relative displacement, and the virtual relative displacement is located on the precise coordinate; and (B) using an algorithm of sum of square difference (SSD) to calculate values between the comparison speckle pattern and each of the virtual reference images, to obtain an SSD value corresponding to each of the virtual reference images, determining a virtual reference image having a minimal SSD value within the virtual reference images, and taking a virtual relative displacement represented by the virtual reference image as a relative displacement.

9. The method of precisely comparing and positioning speckle patterns in claim 6, wherein the precise comparison algorithm comprises steps of:

(A) generating a plurality of virtual reference images according to the original speckle pattern, wherein each of the virtual reference images comprises a virtual complex original coordinate value and a corresponding virtual complex light intensity value, and each of the virtual reference images further represents a virtual relative displacement, and the virtual relative displacement is located on the precise coordinate; and (B) using an algorithm of normalized cross correlation (NCC) to calculate values between the comparison speckle pattern and each of the virtual reference images, to obtain an NCC value corresponding to each of the virtual reference images, determining a virtual reference image having an NCC value closest to 1, and taking a virtual relative displacement represented by the virtual reference image as a relative displacement.

* * * * *